July 11, 1944.  J. CIARLONE  2,353,294
SHEARS
Filed March 4, 1944

INVENTOR.
JOSEPH CIARLONE
BY
atty.

Patented July 11, 1944

2,353,294

UNITED STATES PATENT OFFICE 2,353,294

SHEARS

Joseph Ciarlone, Fitchburg, Mass.

Application March 4, 1944, Serial No. 524,991

4 Claims. (Cl. 30—349)

This invention relates to a cutting device of the general type having a pair of cooperating blades movable to and from each other for the purpose of cutting material, such as for instance a pair of hand shears adapted for any use desired.

Objects of the invention include the provision of a cutting device of the class described having detachable or inserted blades which may be removed or replaced when necessary and which may also be removed and reversed so that each of the detachable blades has two cutting edges, only one of which is used at a time.

Further objects of the invention include the provision of a cutting device of the class described having removable cutting blades, each of which is provided with a pair of recesses adjacent one end thereof, each recess having a hook for placing over and assembly with a pivotal connection or pin such as is usually found in a pair of shears, whereby the inserted blades are easily removed and inserted and are held in place without the use of special fasteners or the like; and the provision of a pair of shears having detachable cutting blades which are both secured to the pivotal connection for the shears so as to thus insure correct pivotal action of the blades during operation of the shears.

Other objects and advantages of the invention will appear hereinafter.

Reference is to be had to the accompanying drawing, in which

Figure 1:
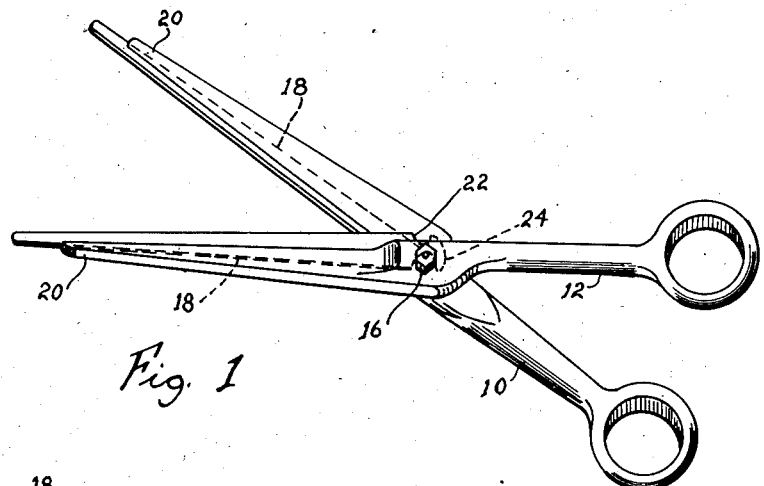
Fig. 1 is a plan view embodying the present invention.

Referring to the drawing in detail, it will be seen that the present invention has been shown for illustrative purposes as applied to a pair of shears having a pair of pivoted blade holding and finger grip elements 10 and 12. A pivotal connection such as a pin 14 is used to connect the blade holding members 10 and 12 in the usual manner and if desired a nut 16 or other device may be employed to secure the pin 14 in position, although many other forms of pivotal connections fall within the scope of the invention.

Figure 3:
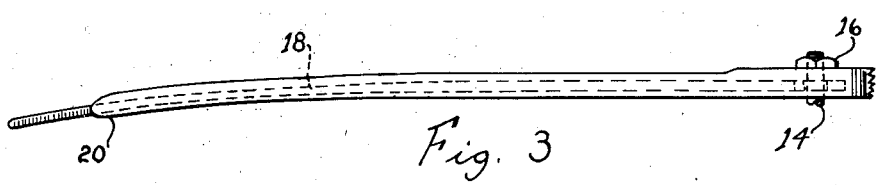
Fig. 3 is a top plan view of the elements of Fig. 2.

Each blade holding member 10 and 12 is grooved or recessed from the region of the pin 14 to the free ends of the blade holding members as shown at 18, these grooves gradually tapering from the deepest point adjacent to the pin 14 to the ends 20 of the blade holding members. As shown in Fig. 3, the blade holding members may be slightly curved for the purpose of applying the correct shearing action to the ends thereof during use.

Figure 4:
Fig. 4 is a section on line 4—4 in Fig. 2.

A long thin cutter blade is adapted to be frictionally held in each of the grooves 18, it being noted that the walls of the grooves are extremely thin as seen in Fig. 4. However, I do not rely merely upon this construction to hold the cutting blades in place and I provide a recess 22 at each side of each cutting blade at its wider end. These recesses are formed to provide hooks 24 which hook over the pin 14, as clearly shown in Fig. 2, and thus it will be seen that the two cutting blades are held from escaping from the blade holders not only by means of friction but also because of the hooks 24 which extend partly around pin 14.

Figure 5:
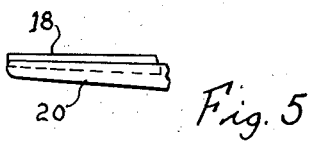
Fig. 5 is a detailed view of a modification of the device.
Figure 2:
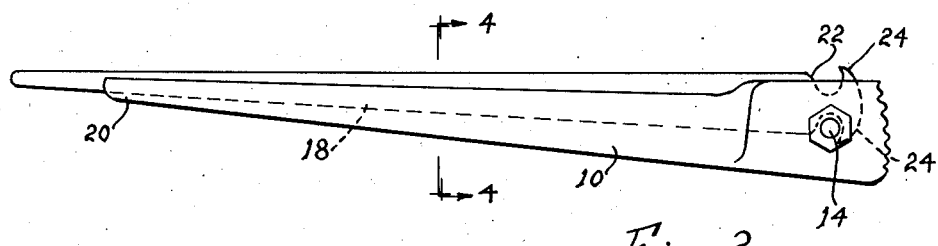
Fig. 2 is an enlarged view in elevation of one of the blades of the device showing the removable blade in assembled relation.

In some cases where it is desired to have narrow ended shears, the removable cutter blades will extend beyond the blade holders as shown clearly in Figs. 2 and 3, but where this is not a required feature the removable blades may terminate approximately at the ends of the blade holders, as seen in Fig. 5.

The present construction provides an advantage over the prior art in that no fasteners of any kind are necessary to hold the inserted blades in place but on the other hand both of the inserted blades are hooked over a single element which is already present in every pair of shears and no further modification of the shears is necessary than to provide the recesses 18.

Having thus described my invention and the advantages thereof, I do not wish to be limited to the details herein disclosed, otherwise than as set forth in the claims, but what I claim is:

1. A cutting device of the class described comprising a pair of blade holding members, a pivotal member connecting the same, each of said blade holding members having longitudinal grooves therein, said grooves opening towards each other and extending from a point at one side of the pivot connection past the latter to the extreme end of the blade holding members, an inserted blade located in each groove, each inserted blade having means forming a hook thereon, said hooks being hooked over the pivotal connection whereby both of the inserted blades are connected to the pivotal connection.

2. A cutting device as recited in claim 1 wherein the inserted blades extend substantially beyond the free ends of the blade holding members to provide extremely thin cutting elements.

3. A cutting device as recited in claim 1 wherein each inserted blade is provided with a recess forming the hook.

4. A cutting device as recited in claim 1 wherein each inserted cutting blade is provided with an additional hook extending oppositely to the first mentioned hook whereby the inserted blades may be removed, reversed, and reinserted to present an additional cutting edge.

JOSEPH CIARLONE.